United States Patent [19]
Miller et al.

[11] 4,029,165
[45] June 14, 1977

[54] CONVERTIBLE CONSTRUCTION MACHINE

[75] Inventors: David J. Miller; Charles P. Miller, both of McHenry, Ill.

[73] Assignee: Miller Formless Co., Inc., McHenry, Ill.

[22] Filed: Feb. 5, 1976

[21] Appl. No.: 655,389

[52] U.S. Cl. .............................. 180/6.48; 180/9.46; 180/9.48; 404/84; 404/98

[51] Int. Cl.² ................... B62D 11/04; B62D 11/20

[58] Field of Search ................. 180/6.48, 9.2, 9.44, 180/9.46, 9.48; 404/98, 84; 37/108 R, DIG. 20; 172/668, 421; 33/185 V

[56] References Cited

UNITED STATES PATENTS

| | | | |
|---|---|---|---|
| 2,090,235 | 8/1937 | Schauer | 180/9.48 X |
| 2,864,452 | 12/1958 | Guntert et al. | 404/84 X |
| 3,249,026 | 5/1966 | Curlett et al. | 404/84 |
| 3,606,827 | 9/1971 | Miller et al. | 404/98 |

*Primary Examiner*—Joseph F. Peters, Jr.
*Assistant Examiner*—John A. Pekar
*Attorney, Agent, or Firm*—Bruce K. Thomas

[57] ABSTRACT

A construction machine is disclosed having a main frame that is supported by means of three or four vertically adjustable suspension points from a pair of walking beams located on opposite sides of the main frame. Each walking beam has a vertical steering axis at each of its ends connected to a bogey-mounted self-propelled ground engagement means in the form of a wheel or endless track.

In one embodiment one of the walking beams is connected to a side of the main frame by two spaced vertically adjustable suspension means that attach to the beam through pivotal bogey-mounts. One of these adjustable suspension means is pivotally mounted to the frame, while the other is fixed to the frame. The other walking beam is connected to the opposite side of the main frame on a single central vertically adjustable suspension means through a bogey-mount to constitute a three-point suspension on two walking beams for the assembly. In a second embodiment, both walking beams have two spaced vertically adjustable suspension means, one of which on each beam is pivoted on a horizontal axis from the frame to constitute a four-point suspension on two modified walking beams.

In each of the embodiments the four ground engagement means at the ends of the walking beams are steerable in pairs, in unison or independently and can be turned or re-oriented about their steering axes so that the direction of travel can be forward or backward (longitudinally) of the frame or toward either side, thus providing flexibility in operation and allowing for side-mounted or straddle-mounted tools. Steering can be in increments, or a full 360° as desired. The frame telescopes in one direction, and the power of the machine used in widening or shortening the frame.

33 Claims, 22 Drawing Figures

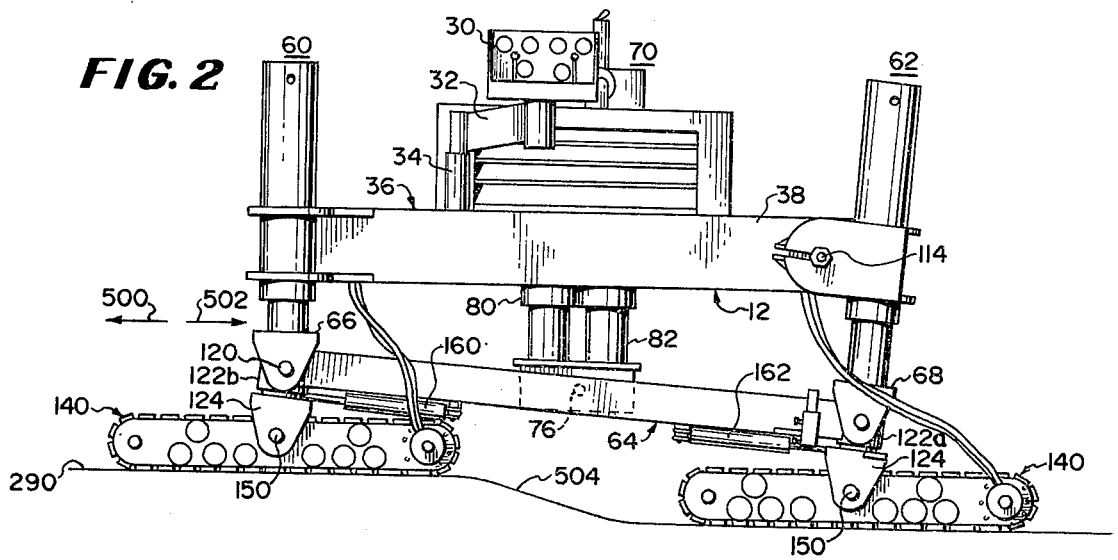
FIG. 2
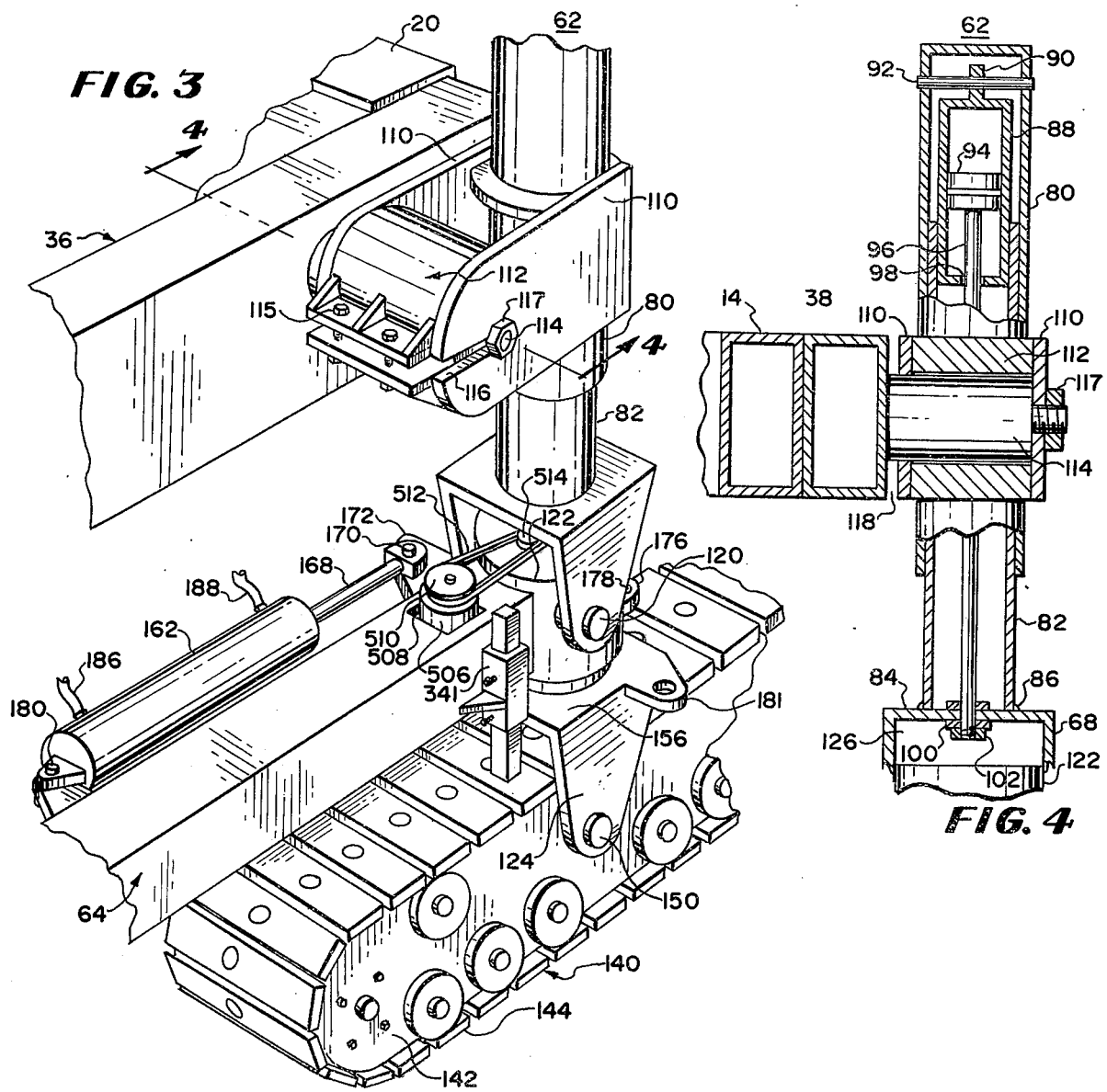
FIG. 3
FIG. 4

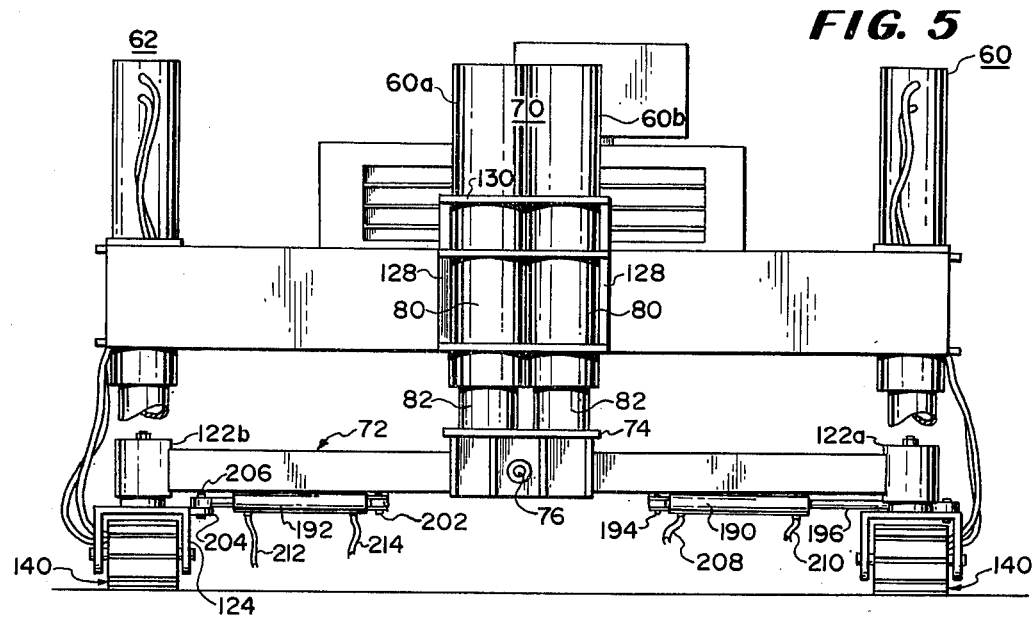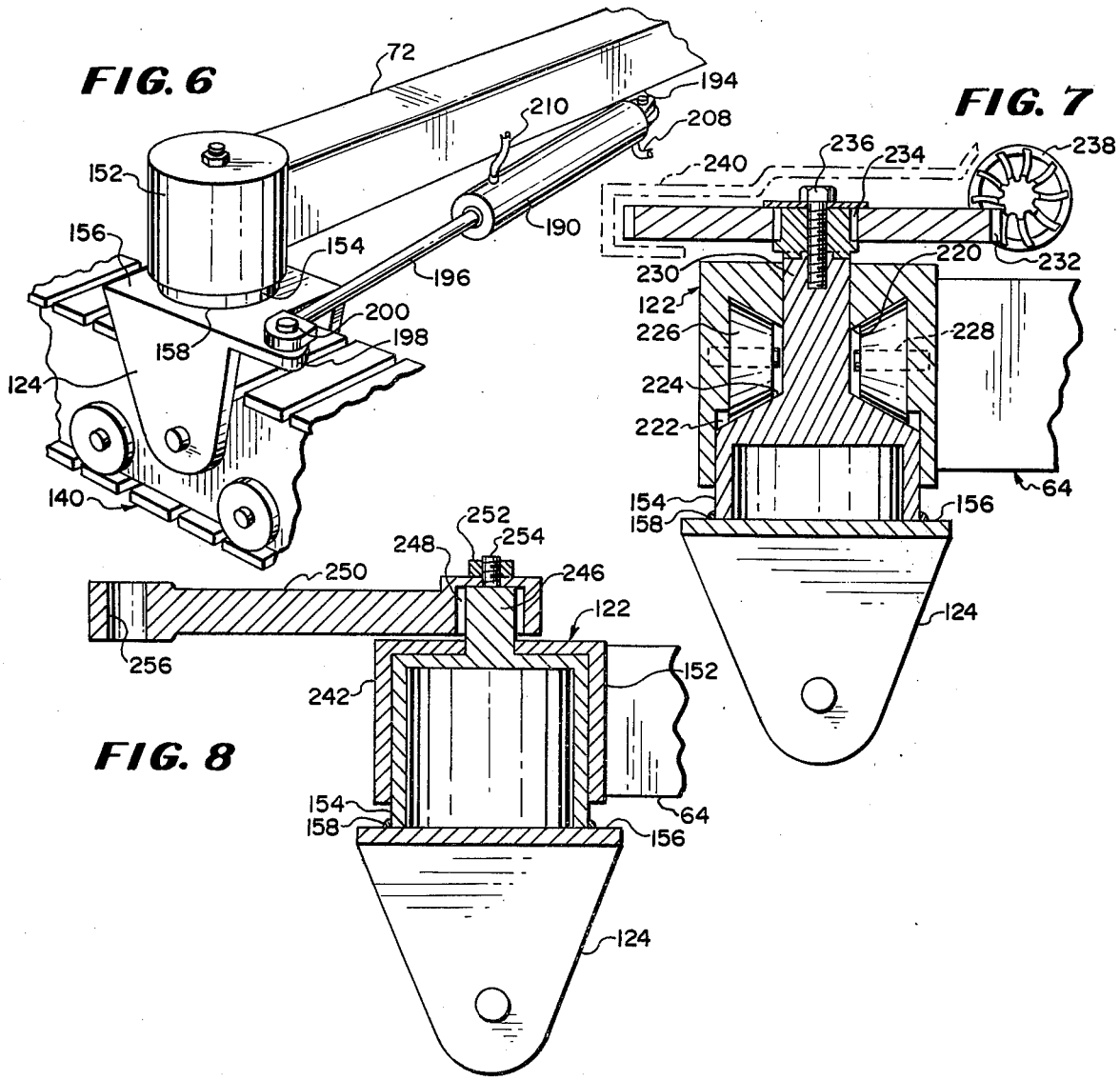

CONVERTIBLE CONSTRUCTION MACHINE

BACKGROUND OF THE INVENTION

The prior art discloses a number of construction machines having either four points of suspension for a flexible frame on four endless tracks, one at each corner; or three points of suspension on a pair of endless tracks, one on each side of the machine having a rigid frame. Notable among these are the machines disclosed in EARLY U.S. Pat. No. 2,844,882; GUNTERT U.S. Pat. No. 2,864,452; KNOX U.S. Pat. No. 2,202,009; STEVENS U.S. Pat. No. 2,128,273 and ALLEN U.S. Pat. No. 2,128,889 along with CURLETT et al. U.S. Pat. No. 3,230,846; CURLETT U.S. Pat. No. 3,249,026; SWISHER et al. U.S. Pat No. 3,423,859 and SNOW et al. U.S. Pat. No. 3,540,360. The two track machines steer by crabbing, a function which causes the machine to steer in an uneven wobbly path that has a serious effect on the control of the grade, slope and direction of the tool. The machine of MILLER et al. U.S. Pat. No. 3,606,827 (by the instant inventors) overcomes this and other defects by using four tracks, one at each corner, two of which on one side carry the rigid frame at a pivot point central of a walking beam. The opposite front pair and the opposite rear pair of tracks are tied together by linkages so that as to be steerable in pairs, i.e., like the front wheels of an automobile. SWISHER et al provide a similar steering arrangement operating from a guide line on each side of the machine. The SWISHER et al machine has a flexible frame and can be raised to position the frame over a truck and the track support members are pivoted upwardly off the ground for movement by the truck to a new location. For longer hauls, the four track members are removed and transported on a separate truck.

Road construction machines, such as that disclosed in SWISHER et al. U.S. Pat. No. 3,423,859 are designed to span the width of one or more lanes of a highway for which purpose sizeable flexible frames and/or elongated track support beams are required. Understandably some provisions must be made for reducing the overall size of the machine for transport from one work location to the other, even to the extent of actually disconnecting the tracks from the frame. Finite adjustment of slope and grade are best provided in machines having a rigid frame.

SUMMARY OF THE INVENTION

In accordance with this invention provision is made to preserve the advantages of a three-point or four-point suspension in a four-track rigid frame machine while at the same time providing flexibility as to the size and location of the tool, without the necessity of providing outriggers for the tracks or dismantling parts for transport and still further providing a machine that can be moved along an axis which extends full circle from the frame. Not only can the four tracks be turned 90° or more in either direction to make the machine operable along two different axes perpendicular to the frame to allow attachment of the tool on any of the four sides or in a straddle position, the frame can be moved along with all four tracks at any desired angle to the frame and the power of one pair of tracks can be used to extend or retract the frame as desired along its telescoping positions.

These multiple functions are made possible by suspending the working tool from a frame that telescopes along an axis transverse to the normal direction of travel along the grade or lane of a roadway being worked upon and supporting the frame from a pair of longitudinally spaced suspension points at one side upon a walking beam through a pair of pivotal saddles. This walking beam has a track member at each end. The other side of the frame is supported by a similar dually suspended second walking beam or by a single suspension means upon the midpoint of the second walking beam which like-wise has a track member at each end. Each track member is rotatably mounted on a vertical steering axis at the end of its respective beam. Provision is made for full transport operation of the machine along with the raising and lowering functions through the suspension points so that the machine can be moved into a straddling position over a tool such as a slip form and lowered thereover for attachment of the tool.

The frame is adapted to be telescoped along an axis perpendicular to the walking beams for the compactness required for transport or curb and gutter work or to extend the frame so that it can straddle a wide work area. Each track is driven by a separate hydraulic drive motor associated with and carried by the track.

DESCRIPTION OF THE DRAWINGS

FIG. 2 is a side view of the machine of FIG. 1 with the tractors turned 90° to show the action of the modified walking beam as it pivots on the bogey-mount at one end and the horizontal pivot attaching the suspension tube to the frame at the other end in negotiating an offset in the grade;

FIG. 3 is an enlarged fragmentary view of the horizontal pivot mount for the suspension tube at one end of a modified walking beam;

FIG. 4 is a cross-sectional view taken along the lines 4—4 of FIG. 3 to show the details of one form of the horizontal pivot and the details of one of the telescoping suspension tubes;

FIG. 5 is a fragmentary plan view to show the center-mounted walking beam on the other side of the main frame;

FIG. 6 is an enlarged fragmentary view showing one form of means for steering a ground engagement means;

FIG. 7 is a cross-sectional view of a spindle-mount above a bogey-mount for a ground engagement means and a pinion gear assembly for 360° steering.

FIG. 8 is a cross-sectional view of another form of spindle mount employing a solid bearing and a lever-actuated steering means;

DESCRIPTION OF THE PREFERRED EMBODIMENT

Figure 1:
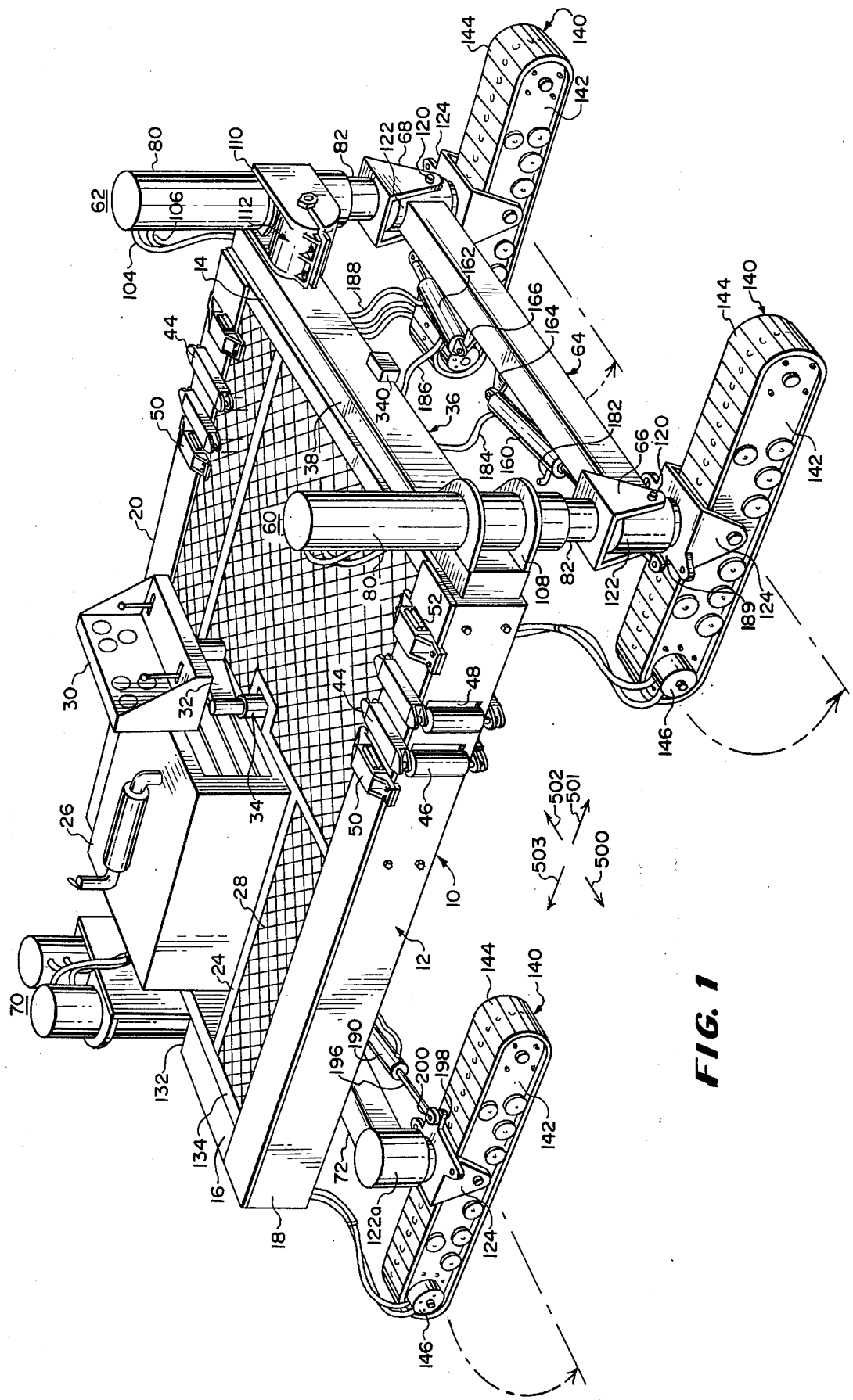
FIG. 1 is a partially diagrammatic perspective view of machine devoid of working tools in compact transport condition.

Referring to FIG. 1, the machine 10 of this invention is shown in diagrammatic form to include the frame 12 comprising the side girder 14 and the opposite side girder 16 tied together by the pair of tubular lgirders 18 and 20 to form a rigid, flat rectangular structure. Rigidifying cross-members such as shown at 22 and 24 form a support for the prime mover 26 and the non-skid grill 28 to define a working platform. The console 30 is rotatably mounted on the pivot arm 32 which is also pivoted from the socket 34 so that the operator can position the console in a number of convenient locations to control the machines' operation and also observe the work product and the progress of the machine.

Figure 15:
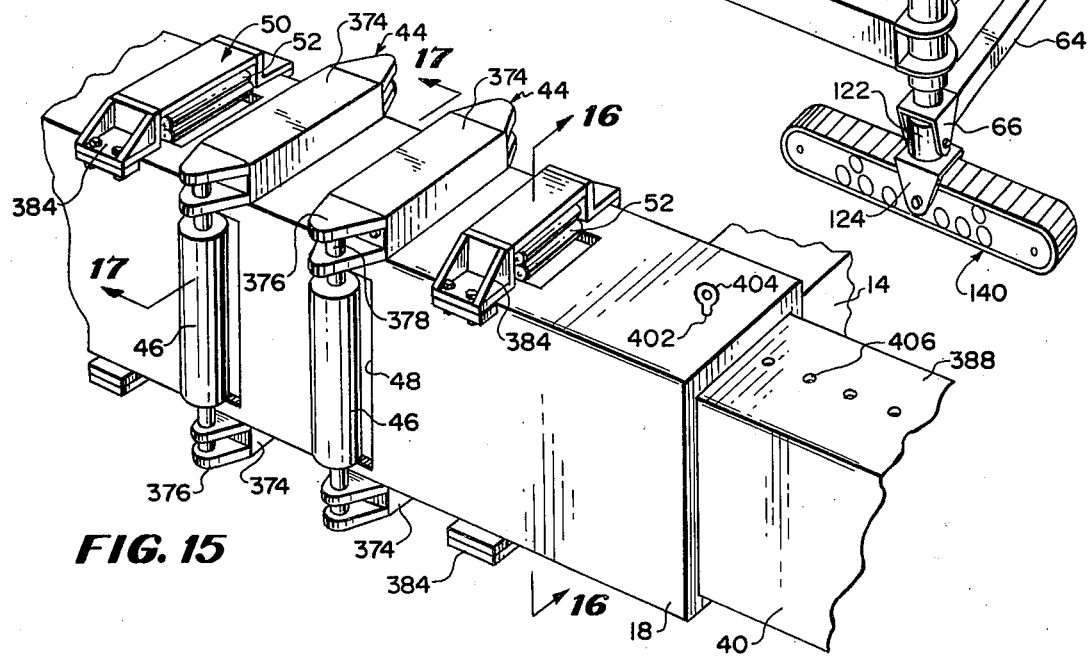
FIG. 15 is an enlarged fragmentary view of a portion of the telescoping frame and guide means used therewith.
Figure 16:
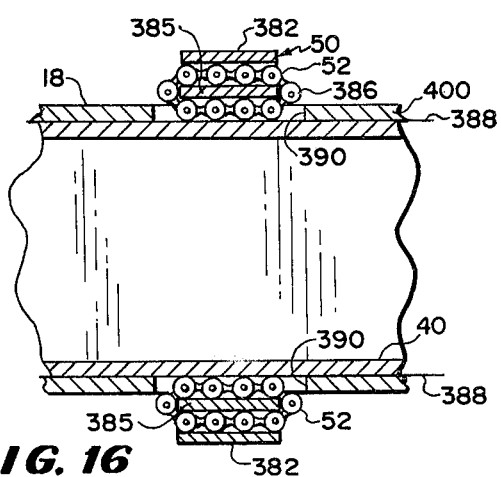
FIG. 16 is a cross-sectional view taken along the lines 16—16 of FIG. 15.
Figure 17:
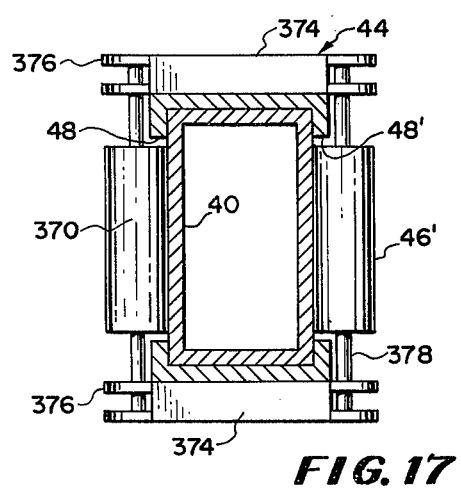
FIG. 17 is a cross-sectional view taken along the lines 17—17 of FIG. 15.

The frame includes an extendible U-shaped frame portion 36 having the outer girder 38 that is about the same size and length as the side girder 14 with a pair of smaller box girders, 40 and 42 (see FIG. 14 momentarily) at the ends that extend inside the tubular girders 18 and 20 in a close fitting telescoping relationship. The smaller box girders 40 and 42 can be as long as or longer than the tubular girders 18 and 20 so that the frame 12 can be extended to span a working area under the frame that is as wide as a single lane of pavement or more. If desired, means can be incorporated to lock the frame 12 in selected extended positions or the tool that is attached underneath the frame can be affixed to both the tubular girders 18 and 20 and the box girders 40 and 42 to fix the extended position of the frame. The box girders 18 and 20 can each have one or more roller assemblies 44 that have a pair of vertically oriented roller members 46 opposed to the openings 48 in the side walls of the tubular girders 18 and 20 and engage the sides of the smaller box girders 40 and 42 to stabilize the U-shaped frame 36 laterally in its extension and retraction and provide a friction-less support. Also the box girders 18 and 20 can have one or more chain roller assemblies 50 that have a pair of horizontally oriented roller chain members 52 opposed to suitable openings in the top and bottom walls of the tubular girders 18 and 20 and like-wise engage the tops and bottoms of the smaller box girders 40 and 42 to stabilize and provide friction-less support for the extensible U-shaped frame 36. The details of the roller assemblies 44 and the chain roller assemblies 50 are shown in FIGS. 15, 16, and 17, to be described.

The frame 12 of the machine 10 and any working tools carried thereby are supported in two different manners in accordance with this invention for finite control of the grade and slope.

FIG. 1 illustrates one embodiment wherein the machine 10 is provided with a pair of adjustable or extendable support means 60 and 62 on one side, connected between the outer girder 38 and the modified walking beam 64 by means of the longitudinally spaced saddles or bogey-mounts 66 and 68; and the other side of the machine is provided with a single centrally mounted adjustable or extendable support means 70 (see also FIG. 5) connected between the side girder 16 and the center of the walking beam 72 by means of the saddle or bogey-mount 74 through the pivot pin 76.

Although, as will be described, the mechanical parts of the adjustable support means 60 and 62 and 70 are essentially the same, they are identified by different numerals for purposes of clarification in describing their functions which differ to certain extents and are the same in others.

Referring the FIGS. 1, 3, and 4, the adjustable support means 62 will be used to illustrate the parts that are common to the other frame support means. These include the open-bottomed guide sleeve or cylinder 80 which fits over and slides upon the inner sleeve 82 which is affixed to the top plate 84 of the bogey-mount 68 by means of the weldment 86. The guide sleeve 80 and the inner sleeve 82 are close fitting cylinders adapted to reciprocate in telescoping relationship to provide a linear up and down movement.

The operating ram 88 is contained with the cylinders 80 and 82 with its housing supported by means of the top central journal 90 pivotally mounted on the clevis pin 92 that extends diametrically across the top of the cylinder 80. The lower end of the ram housing extends within the open top of the inner sleeve 88 and the piston 94 connects to the piston rod 96 that extends through the packing gland 98 to and through the top plate 84 of the bogey-mount 68 where it is affixed by means of the locking flanges 100 and the lock nut 102.

The ram 88 can be single or double-acting, since in the former instance the weight of the machine can cause the retraction of the ram. The hydraulic lines 104 and 106 therefore (FIG. 1) are omitted from FIG. 4 for simplicity, one connecting by means of a flexible cable to the housing 88 above the piston 94 and the other, when used, connecting below the piston. The operation of the ram 88 raises and lowers this corner of the frame 12. The clevis pin 92 permits a slight play in these parts so that the reciprocating sleeves do not bind as they extend and retract, as disclosed in U.S. Pat. No. 3,606,827.

Internally, the extensible support member 60 is the same as the support member 62 just described, however, the extensible support member 60 is affixed to the girder 38 by means of the bracket or encircling flanges 108 e.g. it is not pivotally mounted to the frame. This attachment is made permanent by welding.

The adjustable support means 62 is pivotally mounted to the frame 12 on an axis that extends horizontally of this side of the frame (FIG. 3). For this purpose the pair of support plates 110 is provided that are affixed at one end to the opposite sides of the cylinder 80 and extend inwardly from the corner of the frame to provide support for the bearing cap assembly 112 encircling the pivot pin 114 which is affixed to the outermost box beam 38. The pivot pin 114 is of heavy construction and the bearing cap assembly 112 can be of the split ring type whereby a slotted opening therein allows adjustment of the contact with the pin to prevent looseness, as by means of the adjusting bolts 115. The support plates are appropriately slotted as at 116 so that assembly and dis-assembly are facilitated, and the lock nut 117 provides lateral or axial adjustment of this pivotal connection. As the adjustable support means 62 pivots on the pin 114 the innermost plate 110 may be in guided relationship against the side of the beam 38 or spaced therefrom as shown at 118.

The extendable support member 60 is vertically aligned with the frame and its sleeve 82 attaches to the bogey-mount 66 directly over the pivot pin 120 which is carried by the end of the walking beam at the steering housing 122 defining a vertical steering axis for the second bogey-mount 124. Similarily, the adjustable support means 62 is mounted over the pivot pin 120 of the bogey-mount 68 forming a pivotal attachment to the steering housing 122 on the other end of the walking beam 64. Here again the housing 122 defines a vertical steering axis for the associated bogey-mount 124. Sufficient space at 126 (FIG. 4) is provided between the underside of the plates 84 and the pivot housings 122 of these respective bogey-mounts 66 and 68 so that the walking beam is free to pivot on the pins 120.

Referring to FIGS. 1 and 5 the extensible support member 70 on the other side of the frame 12 is vertically affixed to the girder 16 by means of the pair of mounting plates 128 and the encircling flanges 130 in a manner similar to the extensible member 60. However, in this instance means are provided to maintain the second walking beam 72 in longitudinal alignment with the side of the frame 12. This is accomplished by using a pair of ram units 60a and 60b, so designated because they are identical to the unit 60, in side-by-side relationship. Each has an outer guide cylinder 80 and an inner sleeve 82 that reciprocates therein due to the action of the rams (not shown) which in this instance are operated to extend and retract in unison. The inner sleeves 82 are affixed to the top plate of the single bogey-mount 74, of larger dimensions and the bogey-mount is pivoted to the center of the walking beam 72 by means of the transverse pivot pin 76. The two extensible members 60a and 60b constituting the single extensible support 70 on the opposite side of the main frame keep the walking beam in alignment along the side of the frame 12. The girder 16 has the off-set at 132 (FIG. 1) and the adjustable support means 70 is recessed therein so that this side of the machine is co-planar with the walking beam 72. The inner girder 134 ties these parts together.

Referring back to FIGS. 1, 2 and 5 is is seen that both of the walking beams 64 and 72 are positioned parallel to each other and to the sides of the main frame, and also that each is about the same length as its respective frame side whereby to place the ends of the walking beams under and in substantially vertical alignment but spaced below the four corners of the frame. The extensible support means 60 and 62 are spaced along the one side of the frame member and the extensible support means 70, being about the midpoint of the opposite side of the frame is at a midpoint between the extensible members 60 and 62 to define a three-point suspension between the frame 12 and the walking beams.

A steering spindle is provided at the ends of each walking beam. Thus, as previously described, the walking beam 64 has the steering spindles or housings 122 at its ends while the walking beam 72 has the steering spindles 122a and 122b at its ends, being identically constructed and having the same functions. Each of the tractors 140 has a track frame 142 carrying an endless track 144 and has a drive motor 146 at one end suitably mounted upon the track frame to a drive cog wheel within these tractor units. Each tractor is pivotally attached to a bogey-mount 124 by means of a pivot pin 150 that attaches through a midpoint of its track frame 142.

The steering spindles 122 each have a cylindrical cap member 152 (see FIGS. 3, 6, 7, and 8) in which the spindle bases 154 are rotatably mounted, with their lower ends affixed to the top plates 156 of the lower bogeys 124 by means of the weldments 158.

In one aspect of the invention each of the steering spindles 122 includes means to rotate the lower saddle or bogey 124 and the tractors 140 about their vertical axes at least 90° and preferably about 100° or more, and, if desired, in a complete circle. This rotation can be under finite control and accomplished sequentially, in unison or individually with the machine in motion or standing still as desired.

FIGS. 1, 2, 3, 5, and 6 illustrate one form of steering control and spindle mounting that can be used for these purposes wherein in FIG. 1 the modified walking beam 64 is shown to include the pair of rams 160 and 162 extending in opposite directions along the inside of this support member and having their housing pivotally attached to the spaced cleats 164 and 166 that extend from the central portion of the modified walking beam 64. Referring to FIG. 3, the tractor 140 at this corner of the frame has been turned 90° from its position in FIG. 1 by means of the ram 162 which now has its operating rod 168 attached to the pivot pin 170 carried by the cleat 172 extending from the inside of the top plate 156 of the bogey-mount 124.

This plate 156 also has a second cleat 176 with a bore hole 178 to which the rod 168 and pin 170 were attached when the tractor 140 was in the position shown in FIG. 1. The pivot pins 170 and 180 at the opposite ends of the ram 162 are the quick-release self-locking variety so that the ram 62 can be easily connected to one or more of the cleats sequentially or removed for servicing. The rams 160 and 162 can be of the long stroke type whereby the tractors 140 can be turned in an arc of about 30° or more, each side of the positions shown in FIG. 1, in a single stroke. A third cleat 181 is also shown for further use in turning the tractor 140 in this manner.

The hydraulic lines for the ram 160 are illustrated at 182 and 184 and the hydraulic lines for the ram 162 are illustrated at 186 and 188. The ram 160 connects to the bogey-mount 124 by means of a similar cleat 189 (FIG. 1) and pivot pin, like the pins 170 and 180. Throughout the construction as many parts are made interchangeable as possible.

In either a parallel or tandem position of the tractors on any one walking beam, to accomplish a steering function, the rams 160 and 162 are operated in unison in opposite directions, that is the ram 160 contracts as the ram 162 extends so that the tracks 140 remain parallel like the front wheels of an automobile (FIG. 1) or remain in tandem (FIG. 3) assuming the other tractor is also turned 90°. However, for other purposes these rams may be operated independently and in opposite directions, as will be described for some steering functions or to position the tractors in a tandem relationship along the modified walking beam 64.

In FIGS. 1, 5 and 6 the manner of attachment of the second pair of long-stroke rams 190 and 192 on the other side of the frame 12 is shown. The ram 190 connects between the pivot 194 connected to the housing end on the underside of the walking beam 72 while its operating rod 196 connects to the cleat 198 by means of the quick-release pivot pin 200. Similarly the ram 192 connects between the pivot 202 at the housing end and the cleat 204 and the pivot pin 206 on the bogey-mount 124 at the other end of the beam 72. The hydraulic lines 208 and 210 control the ram 190 and the hydraulic lines 212 and 214 control the ram 192. The rams 160 and 162, 190 and 192 can be identical and are interchangeable, along with their pivot pins. These rams may be short stroke rams since multiple connections are provided.

The rams 190 and 192 are also operated independently, oppositely or in unison and for the purposes described in connection with the rams 160 and 162. Thus steering means for turning the four tractors in unison, in pairs or individually in the same or opposite directions are disclosed.

Other forms of steering control can be used in place of the steering rams just described. As shown in FIG. 7 the steering housing 122 at the end of each walking beam, for example the walking beam 64, can be modified to include the conical bearing surfaces 220 at the top and the offset opening 222 at the bottom which encompasses the base 154 attached to and extending from the bogey-mount 124. The base 154 provides a matching conical bearing surface 224 to contain two or more tapered roller bearings 226 operating on the radial spindles 228 supported from the vertical spindle 230. The driven gear 232 is affixed to the top end of the spindle 230 by means of the spline 234 and the hold down bolt 236. The drive pinion gear 238 engages the driven gear 232 and the drive motor, therefore (not shown) would be mounted on a non-turning part such as the walking beam 64. A suitable safety housing 240 for this arrangement is illustrated in broken lines in FIG. 7.

In order to turn the tractor more than 180° on this vertical steering axis the electrical or hydraulic connections from the power source of the machine to the motor would be disconnected and repositioned to prevent their winding up on the housing 122 or other stationary parts. Quick disconnect fittings are used for this purpose.

In another embodiment shown in FIG. 8 the steering housing 122 at the end of the walking beam 64 comprises an open-bottomed clinder 242 which encompasses the base 154 to form a bearing cap arrangement and the spindle 246 extends through the top center of the cylinder 242 where it is splined at 248 to the steering arm 250 and held thereto by means of the nut 252 attaching to the extension 254. The arm 250 has a suitable boss at its extended end having the vertical bore hole 256 to which a steering ram such as 160 or 162 attaches. The purpose of the arm 250 is to provide leverage for the steering function and also the means by which the arm can be quickly detached from the spindle 246 and re-set at a different angle therefrom on the spline 248. Upon re-attachment of the ram thereto its operation will turn the assembly to the next direction chosen for the tractor at that suspension point. These modified steering arrangements of FIGS. 7 and 8 can also be used with the walking beam 72.

Figure 9:
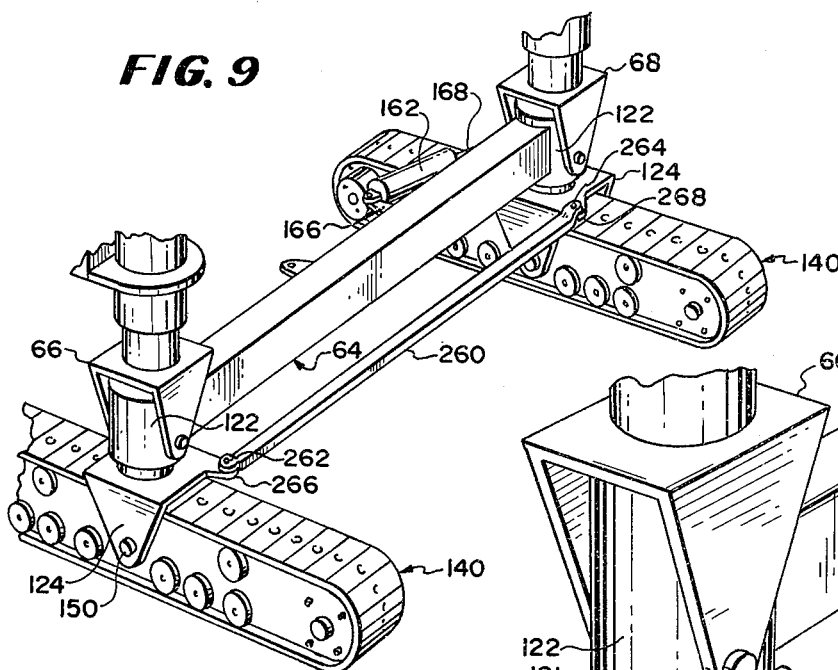
FIG. 9 is a fragmentary perspective view of one side of the machine showing the use of one hydraulic cylinder to control the steering of a pair of ground engagement means.

In FIG. 9 another steering arrangement is disclosed, in this instance illustrated in relation to the modified walking beam 64 although equally applicable to the walking beam 72, wherein the pair of bogey-mounts 124 are tied together by the connecting or radius rod 260 by means of the pivot pins 262 and 264 attaching to the respective cleats 266 and 268. The length of the rod 260, which can be adjustable, is such that the tractors 140 are held in parallel relationship. The single ram 162 and its operating rod 168 connects between the cleat 166 on the inside of the modified walking beam 64 to the pin 170 and associated cleat 172 as illustrated in FIG. 3. The number of cleats used on each bogey-mount can be varied depending on the steering versatility desired in the machine.

Figure 10:
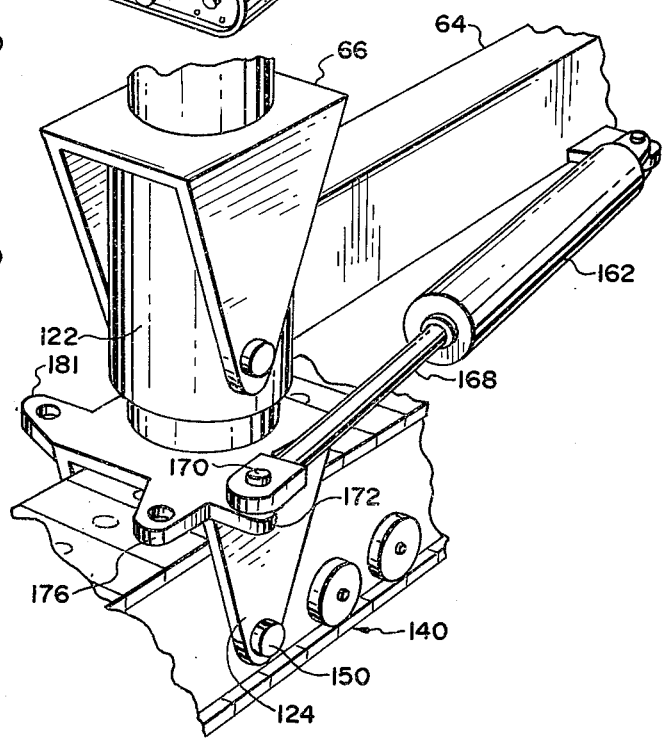
FIG. 10 is a fragmentary perspective view of an end mounting of a walking beam with its associated suspension tube and vertical steering axis for a ground engagement means showing another modification of the steering means.

FIG. 10 illustrates, in relation to the modified walking beam 64, how ram 162 and its operating rod 168 is connected to the pin 170 carried by the cleat 172 which is oriented at about 90° from the cleat 176, and the cleat 181 is 90° from the cleat 176.

Figure 11:
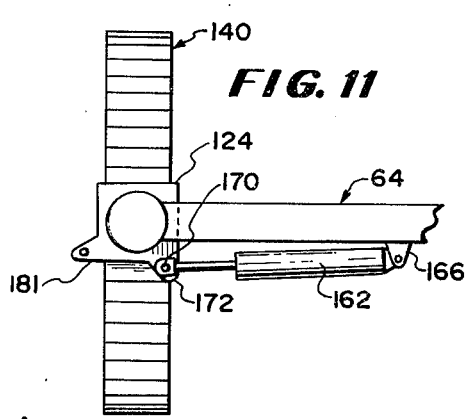
FIGS. 11, 12, and 13 are top plan views of a ground engagement means being turned in sequence through an angle of 90° using the steering means of FIG. 10.
Figures 12, 13:
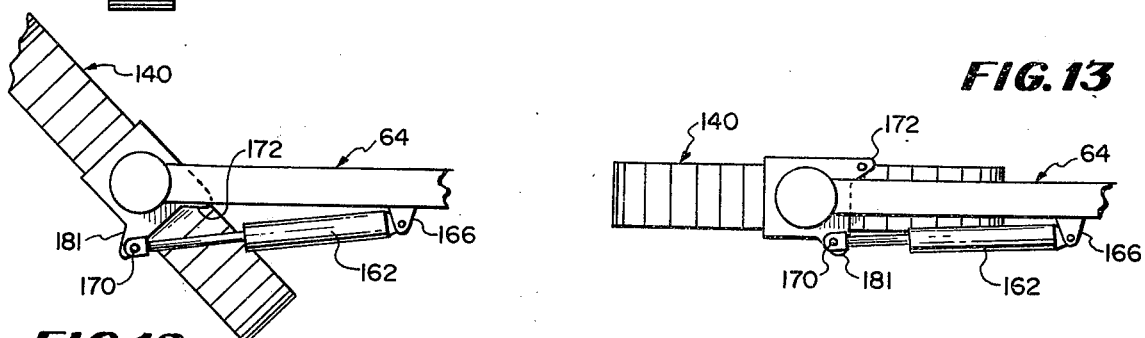

FIGS. 11, 12, and 13 illustrate how the ram 162, for purposes of illustration, is used to re-orient a tractor 140 from a parallel position, FIG. 11, to a tandem position, FIG. 13, in relation to one end of walking beam 64. In FIG. 11 the ram is connected to the cleat 172. Retraction of the ram moves the parts to the position of FIG. 12. The pin 170 is released from the cleat 172 and the ram extended to the position shown in FIG. 12 for attachment to the cleat 181. Upon retraction of the ram the tractor assumes the tandem position of FIG. 13 at which position the piston in the ram is at about the center of its stroke.

Figure 13A:
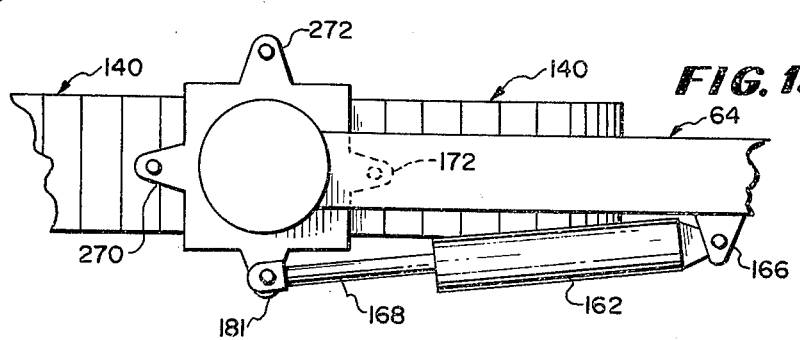
FIG. 13A shows a further modification of the steering means.

FIG. 13A illustrates the use of four cleats, with the additional cleats 270 and 272 oriented at 90° from the others.

Figure 18:
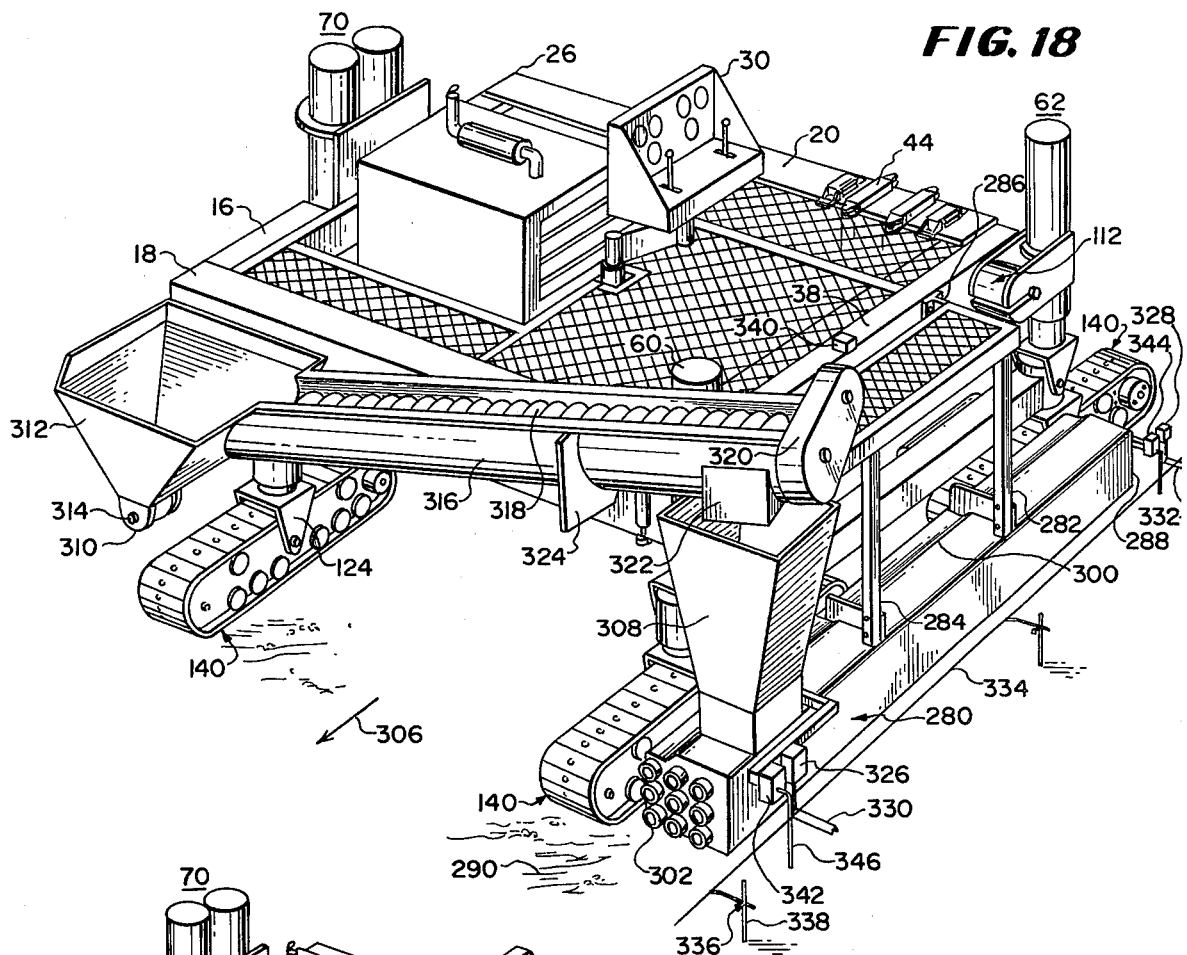
FIG. 18 is a perspective view of the machine having a slip form for curb and gutters mounted along one side and a conveyer system for concrete across the front of the machine.

This process is repeated for the tractors 140 on the ends of the walking beam 72 and the machine, its frame and tractors assume the positions shown in FIG. 18. It is apparent that the machine 10 can have its narrowest length determined by the box beams 18 and 20. With the tractors 140 oriented as shown in FIG. 1 the machine can be run upon a trailer and be transported to and from work sites. Once the machine has been run off the trailer the tractors 140 can be oriented 90° or to the tandem positions shown in FIG. 18 and a working tool such as the specially designed slip form 280 can be attached by means of its frame support members 282 and 284 to spaced bracket mounts 286 on the outer girder 38 with the frame in its retracted position. The slip form 280 has an open rear end 288, from which the extruded concrete curb is deposited upon the prepared grade 290, and a shaped top wall 300 to define the properly contoured type curbing to be laid. The tubes 302 in the front wall 304 are provided for the insertion of reinforcing rods (not shown) by hand as the machine progresses in the direction of the arrow 306. The slip form 280 has the integral vibration hopper 308 in communication with its interior just behind the wall 304.

Figure 19:
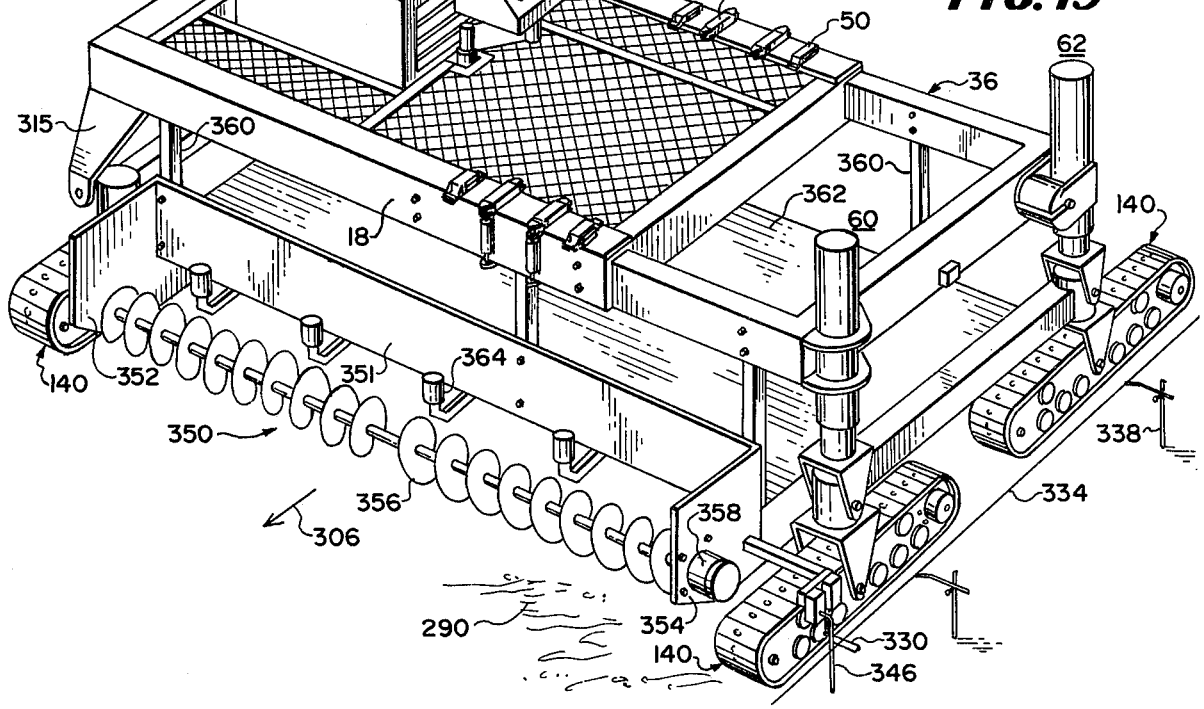
FIG. 19 is a perspective view of the machine with the frame extended and a straddle-mounted tool for laying pavement lanes held between the ground engagement means.

The cleat 310 provides pivot support for the receiving hopper 312 by means of the pin 314 engaging the angle bracket 315 (see FIG. 19). The receiving hopper 312 has an integral chute 316 housing the helical conveyor 318 driven by a motor within the housing 320. The conveyor 318 extends to the bottom of the receiving hopper 312 so that ready-mix concrete is picked up and moved to the delivery chute 322 which dumps the concrete into the vibration hopper 308. In the vibration hopper the concrete is compacted by gravity and vibration and fed to the slip form in a manner known in this art. The slip form 280 is open at the bottom along its length. The central bracket 324 carried by the beam 18 is U-shaped to conform with the contour of the chute 316 and can be adjustable to provide the necessary elevated support for the conveyor chute.

The slip form 280 carries the forward grade sensor 326 and the rearward grade sensor 328 having their respective sensing arms 330 and 332 in contact with the under side of the grade reference line 334 suspended by the brackets 336 supported by the spaced stakes 338. The pendulum operated slope sensor 340 can be located at any position along the center line of the machine extending from the adjustable support means 70, as on the beam 38, so as to be about halfway between the two grade sensors. Suitable adjustable jacks are used to support the sensors 326 and 328 from the tool in a manner well known in this art.

The front steering sensor 342 and the rear steering sensor 344 are located on the slip form at or near the ends of this tool with their pendant sensors 346 in contact with the inside of the string line 334. With a supply of concrete maintained in the hopper 312 from ready mix trucks the machine is capable of laying curb and gutter on the grade 290 to specifications. When the tool is straddle mounted the sensors can be carried on the adjustable bracket 341, shown in FIG. 3, attached to the modified walking beam 64.

In the event the machine is to be used for paving one or more lanes of a highway the frame 12 is extended to the position shown in FIG. 19 to accommodate the concrete spreading and compacting tool 350 which, as is known in the art, includes the screed plate 351 with the side frame member 352 and 354 supporting the elongated helical spreader 356 driven by the motor 358. The tool 350 is adjustably supported from the frame 12 by means of the brackets 360 and has the flat finishing plate 362 for leveling and smoothing out the concrete which is dumped or roughly spread on the prepared grade 290 ahead of the machine, traveling in the direction of the arrow 306. A plurality of pneumatic vibrators 364 are provided as desired. The tool 350 can be attached on the opposite side 20 of the frame, in which event the direction of travel will be opposite to that of arrow 306.

The attachment of either the slip form 280 or the paving tool 350 to the machine 10 is facilitated in that with the tool resting on the ground the machine can be easily maneuvered along side and lowered on its adjustable supports 60, 62 and 70 for attachment to the connecting support brackets. The machine is then raised to its operating position.

Figure 14:
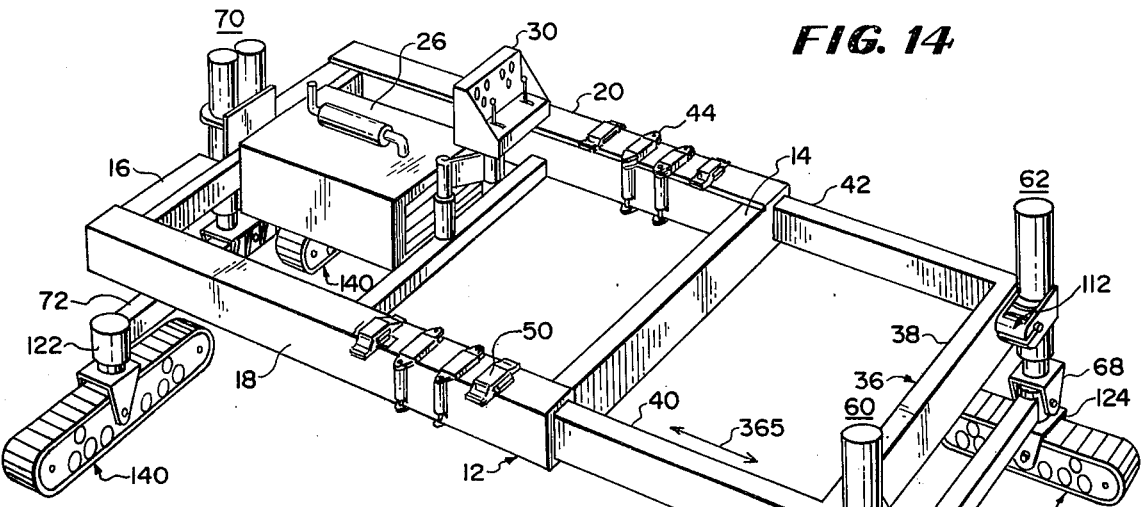
FIG. 14 is a partially diagrammatic perspective view of the machine of FIG. 1 showing the use of one pair of ground engagement means to extend or retract the frame.

FIG. 14 illustrates one manner by which the frame 12 can be extended or retracted, after the machine is run off of its trailer. In this instance the tractors 140 on the walking beam 72 have been turned to their tandem position and the tractors 140 on the modified walking beam 64 are operated in either direction (see arrow 365) in unison to pull the U-shaped frame member 36 outwardly or to push the U-shaped frame member 36 inwardly into a retracted position. Instead of turning the tractors 140 on the walking beam 82 to the tandem position shown in FIG. 14, these tractors can be locked or immobilized to provide the necessary braking action for the extensive or retraction of the frame 12. Alternately, the tractors 140 on the walking beam 64 can perform the locking or braking function and the tractors on the walking beam 72 used to supply the power.

In FIGS. 1, 14, and 19 the U-shaped frame member 36 is shown as telescoping inside the box beams 18 and 20. It is apparent that this relationship could be reversed or that the adjustable supports 60 and 62 attached to the cross-beam 16 on the other side of the frame and the central support 70 can be attached to the U-shaped frame member 36 on the opposite side of the frame.

Because of the size and weight of the machine, the telescoping action of the frame is facilitated by the provision of the roller assemblies 44 to include the spaced pair of side rollers 46 on one side of the box beam 18 (see FIG. 15) supported opposite the openings 48 by means of the identical support bracket members 374 that are affixed to the top and bottom of this beam. The brackets have suitable cleats 376 which rotatably support the rollers on their axles 378. The brackets 374 are double-ended (see FIG. 17) and have an opposing pair of rollers 46 ' on the opposite side with a similar opening 48 ' therein allowing the rollers to ride against the outer sides of the internal telescoping beams 40 and 42 which are part of the U-shaped frame member 36. Any number of such rollers can be used along the sides of the frame.

In addition to the rollers 370 there are provided the roller chain assemblies 50 which include the top and bottom roller chains 52 (FIG. 16) that are contained within the housings 382, affixed to the box beams 18 and 20 by means of the brackets 384. The roller chains 52 encompass the divider wall 385 provided in each housing which allows the individual rollers 386 thereof to be pressed downwardly or upwardly in rolling contact against the top and bottom walls 388 of the beams 40 and 42 and also allows the entire chain to travel around the guide walls 385. The openings 390 are provided in the wall 400 o the tubular girders 18 and 20 so that rolling contact between the chains and the walls is provided. The roller assemblies 50 can be suitably lubricated, as desired. By these means both vertical and lateral rolling support for the U-shaped frame member within the tubular girders facilitates the telescoping action. Actually the beams 40 and 42 are carried within the outer beams 18 and 20 in longitudinally spaced relationship and the only contact is through the rollers 46 and the chains 52.

Normally it is not necessary to lock the frame in any particular extended position since the machine carries the paving tool 350 from both portions of the frame by means of the various rigid supports 360 and the screed 362 is also a rigidifying connecting member which would prevent further telescoping once it is attached. However, if desired, the external box girders 18 and 20 can be provided with a suitable bore hole 402 to accommodate the drop pin 404 which engages any one of a series of spaced bore holes 406 in the top wall 388 of the internal girders 40 and 42, as shown in FIG. 15.

Placement of the lock pin 404 into any one of the bore holes 406 as they register with the bore hole 402 will lock the frame in that position.

Figure 20:
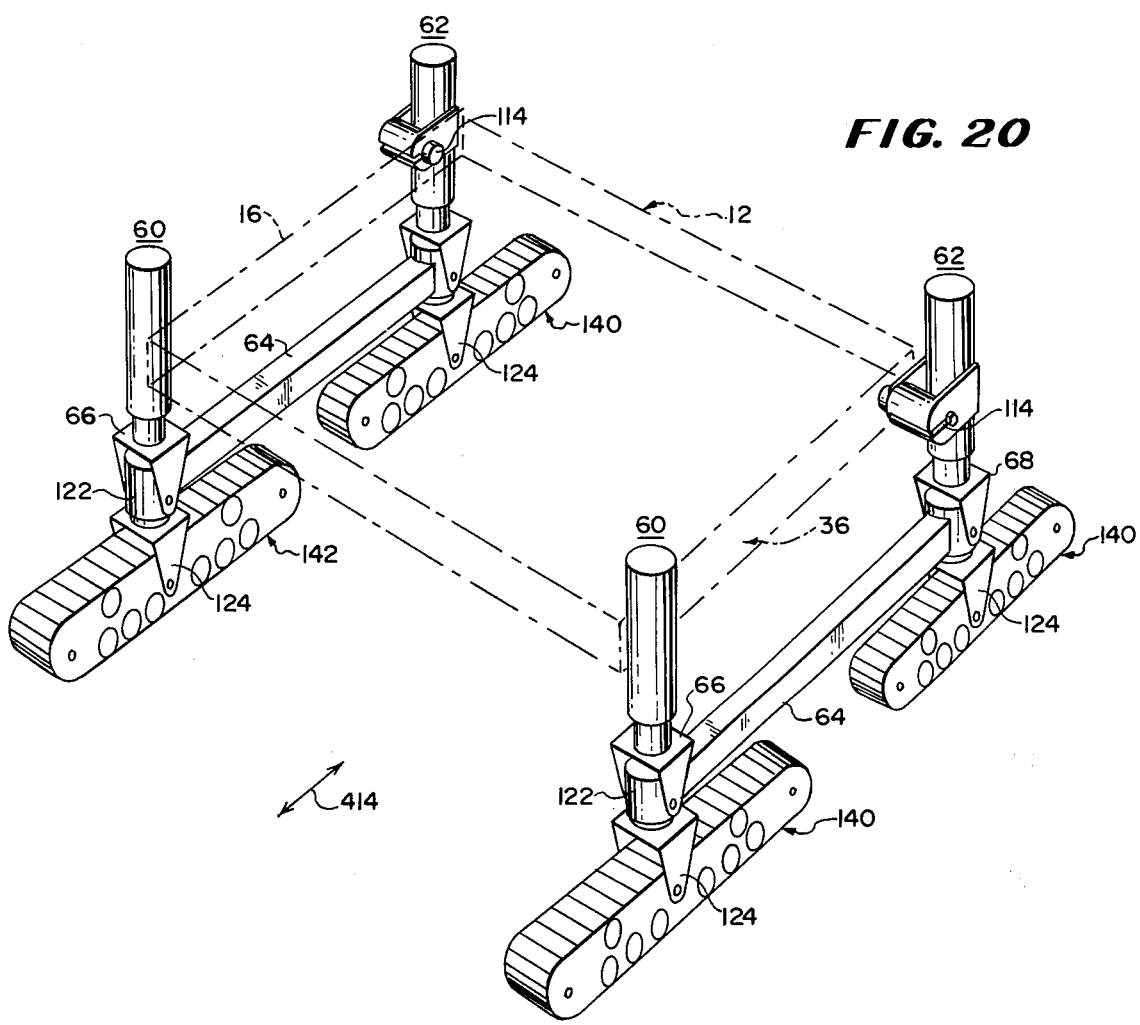
FIG. 20 is a diagrammatic illustration of another embodiment of the invention wherein a pair of modified walking beams is used in a four-point suspension system.

FIG. 20 illustrates a modification of the general frame and suspension assembly wherein the two opposite sides 36 and 16 of the frame 12 which can be rigid or telescoping, are supported by the spaced vertical adjustable means 60 and 62, with their transverse or lateral pivots 114, located at opposite corners of the frame, and with the modified walking beams 64 there below supported by the tractors 140. This arrangement is useful with the tractors oriented in the positions shown in FIG. 20 and the normal directions of travel would be in the directions shown by the double arrow 414. The arrangement shown in FIG. 20 can also be further modified by reversing one of the modified walking beams 64 along its respective side 16 or 36 of the frame 12. This would place the transverse or horizontal pivots 114 on the diagonal in relation to the corners of the frame.

Although the embodiment shown in FIG. 20 including the aforesaid modification does not share all of the versatility and finite grade or slope control of the arrangement of vertical suspension means and walking beams shown in FIG. 1, the machine of FIG. 20 can be used for a large number of paving and earth working operations. Wherein advantage can be taken of the steering versatility along with the ability to negotiate grade deviations as opposed to slope control.

Furthermore the directions of travel for the machine shown in FIG. 20 whether modified to place the pivots 114 on the diagonal are not to be limited to the bi-directional arrow 414 and thwe machine can travel in directions perpendicular thereto as well as at any chosen angular direction in relation to the frame 12.

From the foregoing description it is apparent that the machine of this invention is capable of traveling in any of four directions as indicated by the arrow 500, 501, 502, and 503 in FIG. 1 in relation to the frame and also capable of traveling at any desired angle in relation to the frame. A working tool or tools can be carried in any position on the four sides or under the frame and thereby to do work when carried in any direction. The most difficult position for the tool as far as control is concerned would be on the side of the frame opposite the walking beam 72 because in this position the tool would be pivoted about its center during grade adjustments or when the machine was negotiating deviations in the grade.

Any of the three or four adjustable supports 60, 62 or 70 can be used to control the attitude of the machine 10 in relation to grade or slope. With the machine traveling in the direction of arrow 500 or FIG. 1, the suspension means 60 becomes the front grade control and suspension means 62 becomes the rear grade control while the suspension means 70 controls the slope. If the machine is traveling in the direction of the arrow 502 the suspension means 62 becomes the front grade control, the suspension means 60 becomes the rear grade control, and the suspension means 70 controls the slope.

With the machine 10 traveling in the direction of the arrow 501 or the reverse direction shown by the arrow 503 the suspension means 60 and 62 become the front or rear grade control means or either of the suspension means 60 or 62 can be used for slope control of the entire machine, when operated independently and the suspension means 70 becomes the grade control for the front or rear of the machine. It is obvious that with the machine traveling in the direction of the arrows 501 or 503 in FIG. 1 that the suspension means 70 cannot control slope and becomes either a front or rear grade control.

The unique action of the modified walking beam 64 used in conjunction with the walking beam 72 accounts for this, as shown in FIG. 2 where the machine is negotiating a deviation 504 in the grade 290. The front or rear tractors are higher or lower, as the case may be, with the machine traveling in the directions of the arrows 500 or 502. The central pivot 76 of the central support means 70 on the other side of the frame 12 allows that other side to negotiate the deviation 504 without a change in slope. The pivots 114 and 120, on the other hand plus the action of the bogey-mounts 124 allow the machine to be responsive to the grade sensor and average out the deviation. Also, a machine having the suspension system of FIG. 20 can correct for such a deviation when traveling in either direction, whether or not the deviation extends across the grade in front of both pairs of tendem tractors.

The instant invention also contemplates the use of a homing type of sensor and feed back unit, illustrated by the numeral 506 in FIG. 3. The sensor 506 is mounted in a protective recess 508 in the walking beam 64 just ahead of the steering spindle 122 and has its sensor wheel 510 connected by means of the drive belt 512 to the pulley 514 that rotates with bogey-mount 124 thereunder. One such sensor 506 would be used at each of the steering spindles 122 for the four tractors and a protective housing would be provided for these units.

These sensors 506 are of the homing type having a pre-set angle, zero or null point for the sensor wheel 510 at which no signal is sent to the servo-hydraulic system controlling the steering rams 160, 162 and 190 and 192, assuming this type of steering is employed. Alternately, the sensor 506 can control the drive motors for the pinion gears 230 (FIG. 7) at each corner of the machine. When any one track turns, the pulley 514 is rotated in relation to the walking beam which moves the belt 512 and turns the sensor wheel 510 off the null point. This sends a signal to the servo-hydraulic system and operates the steering means of the opposite tractor to rotate it the same amount, so that the pairs of front and rear tractors steer in unison.

Other modifications of the machine can be made without departing from the invention. A single extensible member instead of the pair of such members 60a and 60b (FIG. 5) can be used provided means are incorporated to maintain the walking beam 72 in parallel aligned relationship with its side of the frame. Also, the extensible member 70 can be affixed directly to the walking beam 72 through the guide tubes 82 and the transverse pivot pin 76 moved up and located between the frame member 16 and the plate 128. This places the pivot 176 in the plane of the frame 12 and also in the plane of the horizontal pivot 114 for the modified walking beam 64, and may be used to gain further finite control of slope and grade.

The curb and gutter tool 280 shown in FIG. 18 can be replaced by a screed adapted to form symmetrical or asymmetrical barrier walls of either linear or curved configuration. Such screeds are well known in the art and include an adjustable sidewall forming the desired shaped configuration and oblique surface portion of the barrier wall so that the respective sides of the barrier wall have their corresponding oblique portions at a predetermined height from the grade or foundation on each side. Also, adjustable skirts can be used adjacent both sidewalls to facilitate the proper adjustment of the screed lower edges in relation to the grade. The adjustable sidewalls are operated manually or automatically from a grade reference.

Figure 21:
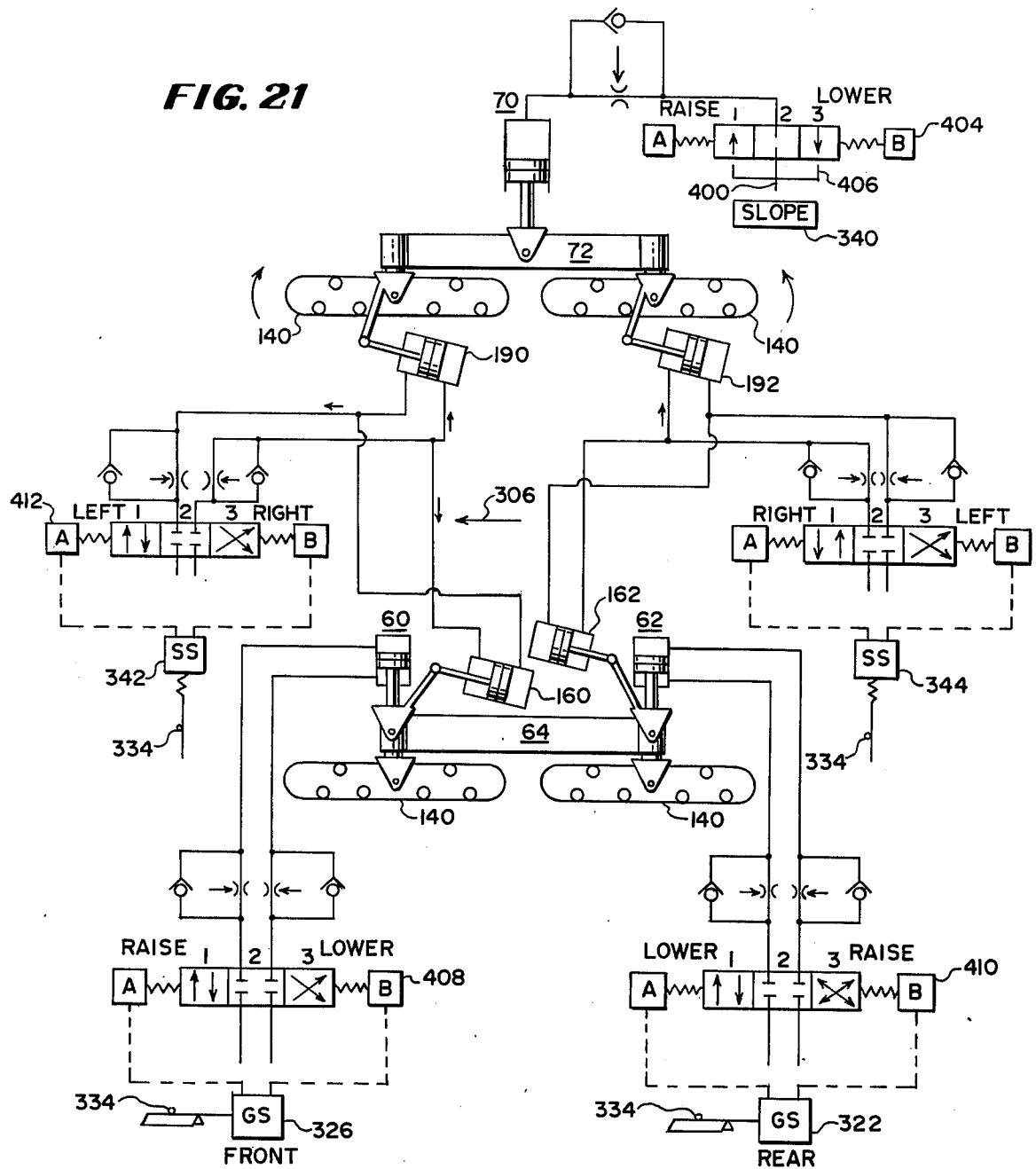
FIG. 21 is a simplified diagrammatic illustration of one form of hydraulic steering and suspension control.

A suitable hydraulic system for steering grade slope control is illustrated in FIG. 21 diagramatically, wherein, the essential parts of the machine are shown, namely the pair of beams 64 and 72, with their associated tractors and their respective steering rams 160, 162, 190 and 192 along with the three suspension points represented by the pair of rams 60 and 62 on one side of the frame and the single central ram 70 on the other side of the frame. Each circuit to a ram includes a check valve and one way valve so that the response of the ram is under control. The source of hydraulic pressure and return is represented by the lines 400 and 402.

It is apparent that the slope control 340 at the top of the diagram controls the ram 70 through the solenoid valve 404. When the desired slope is being maintained as the machine progresses in the direction of the arrow 306, the valve 404 is a position 2 and ram 70 remains stationary. If the tractors supporting the beam 72 meet a depression and this side of the machine lowers, the slope control 340 will cause the valve 404 to move to position 1 and oil from line 400 will cause the ram 70 to extend until the frame is again level at which time the slope control shifts the valve 404 back to position 2. If the side of the machine is too high, the slope control 340 shifts the valve 404 to position 3 and the oil pressure above the piston is returned to sump via line 406.

At the bottom of the diagram the front grade sensor 326 takes its signal from the grade line 334 and controls the solenoid valve 408 controlling the front suspension ram 60 at the forward end of the beam 64. The shifting of the valve 408 to position 1 raises this corner of the machine, the position 2 of the valve 408 represents no height change, while the position number 3 represents the position of the valve where a lowering is called for by the grade sensor 326. Similarly for the rear corner of this side of the machine the grade sensor 322 takes its signal from the same grade line 334 and through the solenoid valve 410 causes it to remain static in position 2, lower in position 1 and raise in position 3.

The front steering sensor 342 takes its signal from the grade line 334 and through the solenoid valve 412 controls the pair of rams 160 and 190 to turn the front tractors left in position 1, maintain the course in position 2 and make a right turn in position 3. The rear steering sensor 344 controls the steering rams 162 and 192 in the same manner through the solenoid valve 414 so that the tractors 140 on the rear ends of the beams 64 and 72 turn left or right in unison. A right turn by the front pair of rams will bring the rear steering sensor 344 away from the string line 334 at the rear of the machine and cause, at first, a slight left turn correction by shifting the solenoid valve to position 3, momentarily, to maintain the sensor in contact with the string line, then a gradual right turn by shifting the solenoid valve 414 to position 1. In this way the frame of the machine or the pair of beams 64 and 74 is maintained in a chordal position on the inside of a right turn and in a tangential position on the outside of a left turn.

When the front tractor on the beam 64 negotiates a change in the elevation of the grade, the change in the attitude of the frame in relation to the grade line contacted by the sensing arm 334 in sensed by the grade sensor 326. This signal shifts the valve 408 to position 1 for extending the ram 60 and to position 3 for lowering the ram 60. However, as the front tractor beneath the ram 60 retracts, for example to allow the machine frame to remain at the pre-established slope and grade, the beam 64 must also pivot to accommodate the change in the effective distance between the bogey-mounts 124 and 68 at the ends of the beam, as shown in FIG. 2. The pivot 114 allows the entire rear suspension 62 to pivot slightly in relation to the frame so that the rear tractor on this same side remains on the grade. The rear suspension 62 (ram 62 of FIG. 21) will therefore extend slightly under the control of the grade sensor 322, ie, move to position 3, so that this corner of the frame remains on grade. Also, the beam 64 will pivot at each of the end pivots 120 while the rear tractor remains on the grade due to its saddle mount 124 and pivot 150.

As the rear tractor on the beam 64 negotiates the change in elevation the ram 62 will retract and the suspension 62 will again pivot back to its normal vertical position. This pivotal action provided by the pivot 114 does not disturb the attitude or the front suspension means 60 nor the attitude of the single ram 70 on the other side of the machine.

The solenoid valve system shown in FIG. 21 has proven to be fully operative to control the machine. However, a servo system can also be used using variable pressure compensated pumps and a proportional feed system or a variable flow proportional control system as supplied by Minneapolis-Honeywell Corporation.

Because of the unique action of the beam 64 as shown in FIG. 2, the machine of FIG. 20 using one such modified walking beam on opposite sides of the main frame has some particular advantages, allowing each of the suspension means to be operated individually for some types of tool control and individually and in pairs for other types of tool control.

In laying one or more lanes of pavement, using a straddle mounted tool 350 of FIG. 19, for example, and a single string line on one side of the machine for both grade and steering control, the opposite side of the machine can be under the control of a slope sensor. If a slope correction is called for the rams on the opposite side can be operated simultaneously to make the necessary correction and either or both of the rams on the other side can be operated individually or simultaneously to control the grade.

It is to be observed that at the moment the front tractor on the walking beam 72 rises up on an obstacle of say 4 inches height, its bogey-mount will raise that end of the beam about one-half that amount or 2 inches. However, since the beam 72 is pivoted to the ram 70 at its center, the correction called for will be only 1 inch or half this amount again. By the time the front tractor is central of the obstacle and the front of the beam 72 has risen the full 4 inches in height in passing therein the ram 70 will have made its full connection of full 2 inches gradually so that the rate of ram operation is reduced as well as the rate of change in elevation of the parts. The same action in reverse repeats itself as the rear end of this tractor negotiates the obstacle. As the rear tractor negotiates the obstacle, the same action and correction takes place as described for the front tractor.

The machine 10 can also be operated with the tractors 140 oriented as shown in FIG. 1 with or without the frame 12 in its extended position shown in FIG. 14. In this event the hydraulic connections of FIG. 21 would be changed so that the rams 60 and 62 are under the control of the slope sensor 340 and the ram 70 is under the control of a grade sensor operating on a grade reference. In this embodiment, the rams 60 and 62 can be operated independently or one of the rams locked and the other used to control the slope. The machine could travel in either direction and preferably the machine would travel with the ram 70 in front and the rams 60 and 62 in the rear.

Since slope is a function of grade but grade is not a function of slope, if a grade change is called for by the grade sensors, in order to maintain the slope the adjustable support members 60 and 62 must extend or retract simultaneously and by the same amount. In those instances where the machine is being used with the member 60 controlling slope and the member 62 controlling grade, then each time the member 62 adjusts the member 60 must also adjust. By cross-connecting the input lines to the members 60 and 62 on both their pressure and return lines with a pilot-operated lock valve, the slope can be isolated from the grade. If the slope control calls for a correction of the member 60, the pilot-operated valves are closed and a slope correction is made without influencing the vertical position of the member 62. The slope and grade corrections, controlled by the adjustable support member 60, 62 and 70 can be isolated one from the other by the use of an isolation amplifier system or a dual pilot valve system. The cross-connecting pilot lock valve arrangement, the dual pilot valve system and the use of an isolation amplifier are described in more detail in co-pending application, Ser. No. 615,767 entitled GRADE TRIMMER, filed in Sept. 22, 1975 by the instant inventors.

It is seen from this description that the invention includes as a non-limiting feature the provision of a construction machine with a main frame that is supported by a first walking beam and its associated pair of adjustable support means with a transverse or horizontal pivot on one side for one of the support means and a second walking beam with its associated centrally mounted single adjustable support means on the other side. Another feature of the invention is the provision of a main frame of a construction machine with a walking beam and the associated pair of adjustable support means and pivot on opposite sides thereof.

The ground engagement means can be wheels, skids or tractors, ie, tract frames carrying an endless track or the like with or without individual power drive means therefore, and the suspension of this invention can be used on small or large machines. A feature of this aspect of the invention is that the ground engagement means are individually steerable about their respective vertical steering axes and the steering is co-ordinatable whereby the pair of ground engagement means on the ends of one of the walking beams and the pair of ground engagement means on the ends of the other walking beam are selectively steerable in unison in a direction of travel substantially perpendicular to or at an angle to the longitudinal axis of said walking beams. Because the steering means are capable of turning the ground engagement means more than 90° about the vertical steering axis, the steering means are also co-ordinatable so that the pairs of ground engagement means on the adjacent or opposite front and rear ends of the walking beams, while in tandem relationship along the longitudinal axis of the beams, are selectively orientable and steerable in pairs in a direction of travel parallel to the walking beams.

Likewise, each of the ground engagement means includes, in one embodiment, a power drive means to propel the ground engagement means in the selected direction of travel. The power drive means are individually controlled and also co-ordinatable whereby in either of the steering positions or paths of travel of the machine, the front and rear pairs of the ground engagement means or driven at the same or different speeds and the front and rear ground engagement means in tandem position along a walking beam or in a position wherein their longitudinal axes are perpendicular to a walking beam can be driven at the same or different speeds from that of the front and rear ground engagement means in the opposite positions in relation to the walking beams. As long as the machine is on a prepared grade and traveling along a substantially linear path all four ground engagement means are normally operated at the same or about the same speed. Under these conditions the negotiation of a curve is facilitated by speeding up the pair of ground engagement means on the outside of the curve or slowing down the pair on the inside of the curve.

When adverse grade conditions are encountered involving obstacles, depressions or mud, it is advantageous to be able to selectively speed up or slow down one or more of the ground engagement means so that the forward motion of the machine is not lost and the machine does not dig itself into the grade. Various types of speed control valves are available for this purpose when hydraulically-driven motors are used to propel the ground engagement means. Also a variable pressure compensated pump can be used to selectively control each drive motor, or pairs of drive motors, such as is described in said co-pending application Ser. No. 615,767. Since the use of speed control valves and pressure compensated pumps in this manner is known in the art, no further description is necessary.

This versatility in the suspension and steering further provides for the use of a telescoping or adjustable frame with or without friction-reducing means along the telescoping parts whereby the power of the machine can be used in extending and retracting the frame. These features of the invention allow the use of a variety of ground working tools, screeds, and slipforms to be carried by the main frame in different locations whereby the machine and its working tool are best fitted to perform the intended work and the slope, grade and steering sensors can be located about the frame in the most convenient and accurate positions.

Other modifications of the machine can be incorporated. Thus, to maintain better control of slope, the single input system shown for the control of the one-way ram 70 in FIG. 21 is replaced by using valves like 412 and 414 in place of the valve 404 and the return to sump eliminated. Also, it is to be understood that feed back loops are to be included in the system shown in FIG. 21 under circumstances where over correction and hunting are to be prevented. FIG. 21 discloses but one steering sensor (342 front) for the pair of front tractors and one steering sensor (344 rear) for the rear tractors. This is for illustration and initiation of the control. Actually, each tractor will have its own steering control system and steering sensor to either follow a reference or be slaved to a corresponding tractor unit for parallel control or tandem control. This is accomplished through the use of the sensor 506 (FIG. 3) on each tractor 140, associated feed back loops connected between said sensors on a front and rear pair of tractors, with the sensors 506 of the tandem tractors being connected to the respective front and rear steering sensors that are taking their signal from the steering reference.

What is claimed is:

1. In a mobile construction machine the combination of:
   a main frame adapted to carry a working tool;
   a pair of vertically adjustable main frame support means spaced along one side of said main frame;
   a first walking beam extending along said one side of said main frame and pivotally mounted to each said main frame support means;
   one of said main frame support means being pivotally mounted to said main frame and a horizontal axis above and in substantially the same plane as its respective pivotal mount on said first walking beam;
   a second vertically adjustable main frame support means on the other side of said main frame;
   a second walking beam extending along said other side of said main frame;
   said second main frame support means being pivotally mounted on an axis transverse and substantially central of the longitudinal axis of said second walking beam; and
   ground engagement means adapted to transport said machine pivotally mounted on means defining individual vertical steering axes at the ends of each of said walking beams to steer said machine.

2. A construction machine in accordance with claim 1 including:
   means to individually steer each of said ground engagement means about its respective vertical steering axis whereby said ground engagement means are turnable from steering positions oriented to transport said machine in a path substantially perpendicular to said walking beams to steering positions oriented to transport said machine in a path substantially parallel to said walking beams;
   said steering means being co-ordinatable whereby in either of said positions the front and rear pairs of said ground engagement means are steerable in unison and independent of each other.

3. A construction machine in accordance with claim 2 including:
   power means to individually drive each of said ground engagement means;
   said power means being co-ordinatable whereby in either of said steering positions the front and rear pairs of said ground engagement means can be driven at substantially the same speed and the front and rear pairs of ground engagement means in tandem position along a walking beam and in tandem position across said walking beams can be driven at different speeds from the front and rear ground engagement means in the opposite position in relation to said walking beams.

4. A construction machine in accordance with claim 2 in which:
   said means to individually steer each of said ground engagement means about its respective vertical steering axis are power means adapted to turn said ground engagement means in a full circle thereabout.

5. A construction machine in accordance with claim 2 in which:
   said ground engagement means are each support from a saddle mount adapted to pivot about said steering axe and
   said means to individually steer said ground engagement means in relation to their respective walking beams comprises:
   a radial steering arm extending from and detachably mountable in selected angular positions from each of said saddle mounts
   the extended end of each of said steering arms being pivotally attached to an extendable member carried by said respective walking beams operable to pivot said steering arms from each of said selected positions and sequentially turn said ground engagement means about said steering axes to said steering positions.

6. A construction machine in accordance with claim 5 in which:
   said radial steering arms for the vertical steering axes of each walking beam extend from the inside of said walking beam;
   said extendable members comprise a pair of hydraulic rams connected to a source of hydraulic power;
   each pair of hydraulic rams being pivotally detachably connected to their respective ends between said side of said walking beam and the extended end of a steering arm; and
   valve means are provided in said hydraulic system to selectively extend and retract said hydraulic rams and pivot said ground engagement means about their vertical steering axis to said selected steering positions and to extend and retract said rams to turn said ground engagement means in unison in any one of said steering positions to control the direction of travel of said machine.

7. A construction machine in accordance with claim 2 in which the means to individually steer each of said ground engagement means comprises:
   a driven member connected to rotate each of said ground engagement means about its vertical steering axis; and
   an individual drive motor is operably connected to each of said driven members whereby to rotate said ground engagement means a full circle.

8. A construction machine in accordance with claim 1 in which:
   said ground engagement means each include an elongated track frame carrying an endless track thereon;
   saddle means are provided for each of said track frames;
   said saddle means each being pivotally connected to said track frames on an axis transverse the longitudinal axis thereof and intermediate their ends;
   each of said saddle means is mounted from the individual vertical steering axes at the ends of said walking beams; and
   means are provided to individually steer each of said track frames and endless tracks about its respective vertical steering axis to turn same into a steering position wherein said endless tracks are oriented to transport said machine in a path substantially perpendicular to said walking beams and to a steering position wherein said endless tracks are oriented to transport said machine in a path substantially parallel to said walking beams;
said steering means being co-ordinatable whereby in either of said positions the front and rear pairs of said endless tracks are steerable in unison and independent of each other.

9. A construction machine in accordance with claim 1 wherein:
said main frame includes two telescoping sections each being attached to one of said walking beams through the associated main frame support means; and
means are provided to extend and retract one section of said main frame in relation to the other section whereby the effective width of said main frame is adjustable.

10. A construction machine in accordance with claim 9 in which:
each of said ground engagement means includes an individual power unit operable to drive a pair of said ground engagement means associated with one of said walking beams and its telescoping section in unison whereby the pair ground engagement means on either side of said main frame is operable to extend and retract said main frame against the holding force of said pair of ground engagement means on the other side of said main frame.

11. In a mobile construction machine the combination of:
a main frame adapted to carry a working tool;
a pair of vertically adjustable main frame support means spaced along one side of said main frame;
a first walking beam extending along said one side of said main frame and pivotally mounted to each of said main frame support means;
one of said main frame support means being pivotally attached to said main frame on a horizontal axis above and substantially in the plane of its pivotal mounting with said first walking beam;
a second pair of vertically adjustable main frame support means spaced along the other opposite side of said main frame;
a second walking beam extending along said other side of said main frame and pivotally mounted to each of said second main frame support means;
one of said second main frame support means being pivotally attached to said main frame on a horizontal axis above and substantially in the plane of its pivotal mounting with said second walking beam; and
ground engagement means adapted to transport said machine pivotally mounted on means defining individual vertical steering axes at the ends of each of said walking beams to steer said machine.

12. A mobile construction machine in accordance with claim 11 in which:
the horizontal pivotal mount of said one frame support means on said one side of said main frame and the horizontal pivotal mount of said one frame support means on said other opposite side of said main frame are at adjacent corners of said main frame.

13. A mobile construction machine in accordance with claim 11 in which:
the horizontal pivotal mount of said one frame support means on said side of said main frame and the horizontal pivotal mount of said one frame support means on said other opposite side of said main frame are at diagonal corners of said main frame.

14. A construction machine in accordance with claim 11 including:
means to individually steer each of said ground engagement means about its respective vertical steering axis in relation to its walking beam whereby said ground engagement means are turnable from steering positions oriented to transport said machine in a path substantially perpendicular to said walking beams to steering positions oriented to transport said machine in a path substantially parallel to said walking beams;
said steering means being co-ordinatable whereby in either of said positions the front and rear pairs of said ground engagement means are steerable in unison and independent of each other.

15. A construction machine in accordance with claim 14 including:
power means to individually drive each of said ground engagement means;
said power means being co-ordinatable whereby in either of said steering positions the front and rear pairs of said ground engagement means can be driven at substantially the same speed and the front and rear pairs of ground engagement means in tandem position along a walking beam and in tandem position across said walking beams can be driven at different speeds from the front and rear ground engagement means in the opposite position in relation to said walking beams.

16. A construction machine in accordance with claim 14 in which:
said means to individually steer each of said ground engagement means about its respective vertical steering axis are power means adapted to turn said ground engagement means in a full circle thereabout.

17. A construction machine in accordance with claim 14 in which:
said ground engagement means are each supported from a saddle mount to pivot about said steering axes; and
said means to individually steer said ground engagement means in relation to its walking beam comprises:
a radial steering arm extending from and detachably mountable in selected angular positions from each of said saddle mounts;
the extended end of each of said steering arms being pivotally attached to an extendable member carried by said respective walking beams operable to pivot said steering arms from each of said selected positions and sequentially turn said ground engagement means about said steering axes to said steering positions.

18. A construction machine in accordance with claim 17 in which:
said radial steering arms for the vertical steering axes of each walking beam extend from the inside of said walking beam;
said extendable members comprise a pair of hydraulic rams connected to a source of hydraulic power;
each pair of hydraulic rams being pivotally and detachably connected at their respective ends between said side of said walking beam and the extended end of a steering arm; and valve means are provided in said hydraulic system to selectively extend and retract said hydraulic rams and pivot said ground engagement means about their vertical steering axis to said selected steering positions and to extend and retract said rams to turn said ground engagement means in unison in any one of said steering positions to control the direction of travel of said machine.

19. A construction machine in accordance with claim 14 in which the means to individually steer each of said ground engagement means comprises:
   a driven member connected to rotate each of said ground engagement means about its vertical steering axis; and
   an individual drive motor is operably connected to each of said driven members whereby to rotate said ground engagement means a full circle.

20. A construction machine in accordance with claim 11 in which:
   said ground engagement means each include an elongated track frame carrying an endless track thereon;
   saddle means are provided for each of said track frames;
   said saddle means each being pivotally connected to said track frames on an axis transverse the longitudinal axis thereof and intermediate their ends;
   each of said saddle means is mounted from the individual vertical steering axes at the ends of said walking beams; and
   means are provided to individually steer each of said track frames and endless tracks about its respective vertical steering axis to turn same into a steering position wherein said endless tracks are oriented to transport said machine in a path substantially perpendicular to said walking beams and to a steering position wherein said endless tracks are oriented to transport said mahcine in a path substantially parallel to said walking beams;
   said steering means being co-ordinatable whereby in either of said positions the front and rear pairs of said endless tracks are steerable in unison and independent of each other.

21. A construction machine in accordance with claim 11 wherein:
   said main frame includes two telescoping sections each being attached to one of said walking beams through the associated main frame support means; and
   means are provided to extend and retract one section of said main frame in relation to the other section whereby the effective sidth of said main frame is adjustable.

22. A construction machine in accordance with claim 21 in which:
   each of said ground engagement means includes an individual power unit operable to drive a pair of said ground engagement means associated with one of said walking beams and its telescoping section in unison whereby the pair of ground engagement means on either side of said main frame is operable to extend and retract said main frame against the holding force of said pair of ground engagement means on the other side of said main frame.

23. A construction machine comprising:
   a main frame;
   a pair of vertically adjustable main frame support means spaced along one side of said main frame;
   a first walking beam extending along said one side of said main frame and pivotally mounted to each of said main frame support means;
   one of said main frame support means being pivotally mounted to said main frame on a horizontal axis above and in substantially the same plane as its respective pivotal mount on said first walking beam;
   a second vertically adjustable main frame support means on the other side of said main frame;
   a second walking beam extending along said other side of said main frame;
   said second main frame support means being pivotally mounted on an axis transverse and substantially central of the longitudinal axis of said second walking beam;
   ground engagement means adapted to transport said machine pivotally mounted on means defining individual vertical steering axes at the ends of said walking beams to steer said machine;
   said ground engagement means being positionable to transport and steer said machine in a first path perpendicular to said walking beams and in a second path parallel to said walking beams;
   actuating means operatively connected to said pair of adjustable main frame support means and responsive to slope control means to independently adjust said pair of main frame support means and control the slope of said main frame along said first path of travel, and responsive to a reference disposed along said second path of travel to independently and simultaneously adjust said pair of main frame support means to control the grade of said main frame along said second path of travel;
   actuating means operatively connected to said second adjustable main frame support means and responsive to a reference disposed along said first path of travel to independently adjust said second main frame support means and control the grade of said main frame along said first path of travel and responsive to slope control means to independently adjust said second adjustable main frame support means and control the slope of said main frame along said second path of travel;
   power means to steer pairs of said ground engagement means in unison about their respective steering axes in both said first and second paths of travel; and
   actuating means operatively connected to said power steering means and responsive to a reference disposed along both paths of travel.

24. A construction machine comprising:
   a main frame;
   a first pair of vertically adjustable main frame support means spaced along one side of said main frame;
   a first walking beam extending along said one side of said main frame and pivotally mounted to each of said main frame support means;
   one of said first pair of main frame support means being pivotally mounted to said main frame on a horizontal axis above and in substantially the same plane as its respective pivotal mount on said first walking beam;
   a second pair of vertically adjustable main frame support means spaced along the other side of said main frame;

a second walking beam extending along said other side of said main frame;

one of said second pair of main frame support means being pivotally mounted to said main frame on a horizontal axis above its respective pivotal mount on said second walking beam;

ground engagement means adapted to transport said machine pivotally mounted on means defining individual vertical steering axes at the ends of said walking beams to steer said machine;

said ground engagement means being positionable to transport said machine in a first path substantially perpendicular to said walking beams and in a second path substantially parallel to said walking beams;

actuating means operatively connected to said first and second pair of adjustable main frame support means and responsive to grade and slope references to independently and simultaneously adjust said main frame support means along both paths of travel;

power means to steer pairs of said ground engagement means in unison about their respective steering axes in both said first and second paths of travel; and actuating means operatively connected to said power steering means and responsive to a reference disposed along both paths of travel.

25. A construction machine comprising:

a main frame adapted to support a working tool;

said main frame including a pair of substantially U-shaped telescoping sections each having a connected transverse side girder said side girders being movable away from and toward each other;

a pair of vertically adjustable main frame support means disposed in spaced relationship along one of said side girders;

a first walking beam extending along said one side girder and pivotally mounted to each of said main frame support means;

one of said main frame support means being pivotally mounted to said one side girder on a horizontal axis extending transverse the length of said one side girder;

a second vertically adjustable main frame support means disposed from said other side girder and substantially centrally opposite said pair of vertically adjustable main frame support means;

a second walking beam extending along said other side girder;

said second walking beam being pivotally mounted from said second vertically adjustable main frame support means;

ground engagement means adapted to transport said machine disposed on means defining individual vertical steering axes at the ends of each of said walking beams to steer said mahcine; and said ground engagement means being positionable in pairs to transport and steer said machine along a first path of travel substantially perpendicular to said walking beams and in a second path of travel substantially parallel to said walking beams whereby in both paths of travel said vertically adjustable main frame support means control the attitude of said main frame and working tool and in said first path of travel said ground engagement means are adapted to accommodate the extension and retraction of said telescoping frame sections in relation to each other to vary the width of said main frame between said walking beams.

26. A construction machine in accordance with claim 25 in which:

actuating means are operatively connected to said pair of adjustable main frame support means and responsive to a reference to control the attitude of said main frame along one axis;

actuating means are operatively connected to said second main frame support means and responsive to a reference to control the attitude of said main frame along another axis; and power means are operatively connected to said ground engagement means to drive same in front and rear pairs and in unison about their respective vertical steering axes in both paths of travel.

27. A construction machine in accordance with claim 26 including:

power means to steer said ground engagement means in front and rear pairs about their respective steering axes in both of said paths of travel;

said power steering means being responsive to an external reference extending along either of said paths of travel whereby to maintain said machine in alignment with said external reference.

28. A construction machine comprising:

a main frame;

a first pair of vertically adjustable main frame support means spaced along one side of said main frame;

a first walking beam extending along said one side of said main frame and pivotally mounted to each of said main frame support means;

one of said first pair of main frame support means being pivotally mounted to said main frame on a horizontal axis above and in substantially the same plane as its respective pivotal mount on said first walking beam;

a second pair of vertically adjustable main frame support means spaced along the other side of said main frame;

a second walking beam extending along said other side of said main frame;

one of said second pair of main frame support means being pivotally mounted to said main frame on a horizontal axis above and in substantially the same plane as its respective pivotal mount on said second walking beam; and ground engagement means adapted to transport said machine pivotally mounted on means defining individual vertical steering axes at the ends of said walking beams to steer said machine;

said ground engagement means being positionable about said steering axes to transport said machine in a plurality of selected paths extending 360° around each of said steering axes.

29. A construction machine in accordance with claim 28 in which:

said ground engagement means each include an elongated track frame carrying an endless track thereon;

saddle means are provided for each of said track frames;

said saddle means each being pivotally connected to said track frames on an axis transverse the longitudinal axis thereof and intermediate their ends;

each of said saddle means is mounted from the individual vertical steering axes at the ends of said walking beams; and means are provided to individually steer each of said track frames and endless tracks about its respective vertical steering axis to turn same into a steering position wherein said endless tracks are oriented to transport said machine in said plurality of paths;

said steering means being co-ordinatable whereby in either of said positions the front and rear pairs of said endless tracks are steerable in unison and independent of each other.

30. A construction machine in accordance with claim 28 wherein:

said main frame includes two telescoping sections each being attached to one of said walking beams through the associated main frame support means; and means are provided to extend and retract one section of said main frame in relation to the other section whereby the effective width of said main frame is adjustable.

31. A construction machine in accordance with claim 30 in which:

each of said ground engagement means includes an individual power unit operable to drive a pair of said ground engagement means associated with one of said walking beams and and its telescoping section in unison whereby the pair ground engagement means on either side of said main frame is operable to extend and retract said main frame against the holding force of said pair of ground engagement means on the other side of said main frame.

32. A construction machine in accordance with claim 28 in which: p1 the horizontal pivotal mount of said one frame support means on said one side of said main frame and the horizontal pivotal mount of said one frame support means on said other opposite side of said main frame are at adjacent corners of said main frame.

33. A construction machine in accordance with claim 28 in which:

the horizontal pivotal mount of said one frame support means on said one side of said main frame and the horizontal pivotal mount of said one frame support means on said other opposite side of said main frame are at diagonal corners of said main frame.

* * * * *

UNITED STATES PATENT OFFICE
CERTIFICATE OF CORRECTION

PATENT NO. : 4,029,165
DATED : June 14, 1977
INVENTOR(S) : DAVID J. MILLER and CHARLES P. MILLER It is certified that error appears in the above-identified patent and that said Letters Patent are hereby corrected as shown below:

IN THE CLAIMS:

Column 18, line 5, delete "support" and insert ---- supported ----;

line 7, delete "axe" and insert -- axes --;

line 28, after "pivotally" insert -- and --.

Column 19, line 67, before "side" insert -- one --.

Column 21, line 38, delete "mahcine" and insert --- machine ---;

line 52, delete "sidth" and insert -- width-

Column 26, line 11, delete "pl".

Signed and Sealed this

Twenty-ninth Day of November 1977

[SEAL]

Attest:

RUTH C. MASON
Attesting Officer

LUTRELLE F. PARKER
Acting Commissioner of Patents and Trademarks